(12) United States Patent
Panoz et al.

(10) Patent No.: US 6,357,822 B1
(45) Date of Patent: Mar. 19, 2002

(54) SIDE IMPACT BEAM ASSEMBLY

(75) Inventors: Daniel E. Panoz, 2180 Rue Charlemage St., Braselton, GA (US) 30517; John Leverett, Flowery Branch; William T. McClendon, Stockbridge, both of GA (US)

(73) Assignee: Daniel E. Panoz, Braselton, GA (US)

( * ) Notice: Subject to any disclaimer, the term of this patent is extended or adjusted under 35 U.S.C. 154(b) by 0 days.

(21) Appl. No.: 09/625,437

(22) Filed: Jul. 26, 2000

(51) Int. Cl.[7] .................................................. B60J 7/00
(52) U.S. Cl. ........................ 296/209; 296/189; 296/205; 296/203.03
(58) Field of Search ................................ 296/209, 188, 296/189, 203.03, 205; 293/128

(56) References Cited

U.S. PATENT DOCUMENTS

| | | | |
|---|---|---|---|
| 2,997,329 A | * | 8/1961 | Chapman |
| 3,140,891 A | * | 7/1964 | Shreffler |
| 4,493,506 A | * | 1/1985 | Alexander |
| 4,607,878 A | * | 8/1986 | Itoh ........................ 296/209 X |
| 4,881,756 A | | 11/1989 | Kumasaka et al. |
| 4,911,495 A | * | 3/1990 | Haga et al. .................. 296/209 |
| 5,443,297 A | * | 8/1995 | Tanaka et al. .......... 296/209 X |
| 5,573,297 A | | 11/1996 | DeRees et al. |
| 5,765,906 A | * | 6/1998 | Iwatsuki et al. ........ 296/209 X |
| 5,785,376 A | | 7/1998 | Nees et al. |
| 5,884,960 A | | 3/1999 | Wycech |
| 5,887,938 A | | 3/1999 | Topker et al. |
| 5,908,216 A | | 6/1999 | Townsend |
| 5,924,760 A | | 7/1999 | Krajewski et al. |
| 5,954,390 A | | 9/1999 | Kleinhoffer et al. |
| 6,030,030 A | * | 2/2000 | Riddle et al. ................ 296/209 |

FOREIGN PATENT DOCUMENTS

EP 37587 * 10/1981 .................. 296/209

* cited by examiner

Primary Examiner—Joseph D. Pape
(74) Attorney, Agent, or Firm—Brooks & Kushman P.C.

(57) ABSTRACT

A side rail assembly for a vehicle having a chassis beam and a protective beam that are secured together by interlocking elements. The protective beam is preferably formed of a softer material than the chassis beam. The protective beam has an outboard wall that is spaced from an inboard wall and s-shaped wall sections interconnecting the outboard wall and inboard wall. The cell walls and an upper portion of the upper wall are preferably curved to facilitate preferential deformation in the event of an impact.

14 Claims, 1 Drawing Sheet

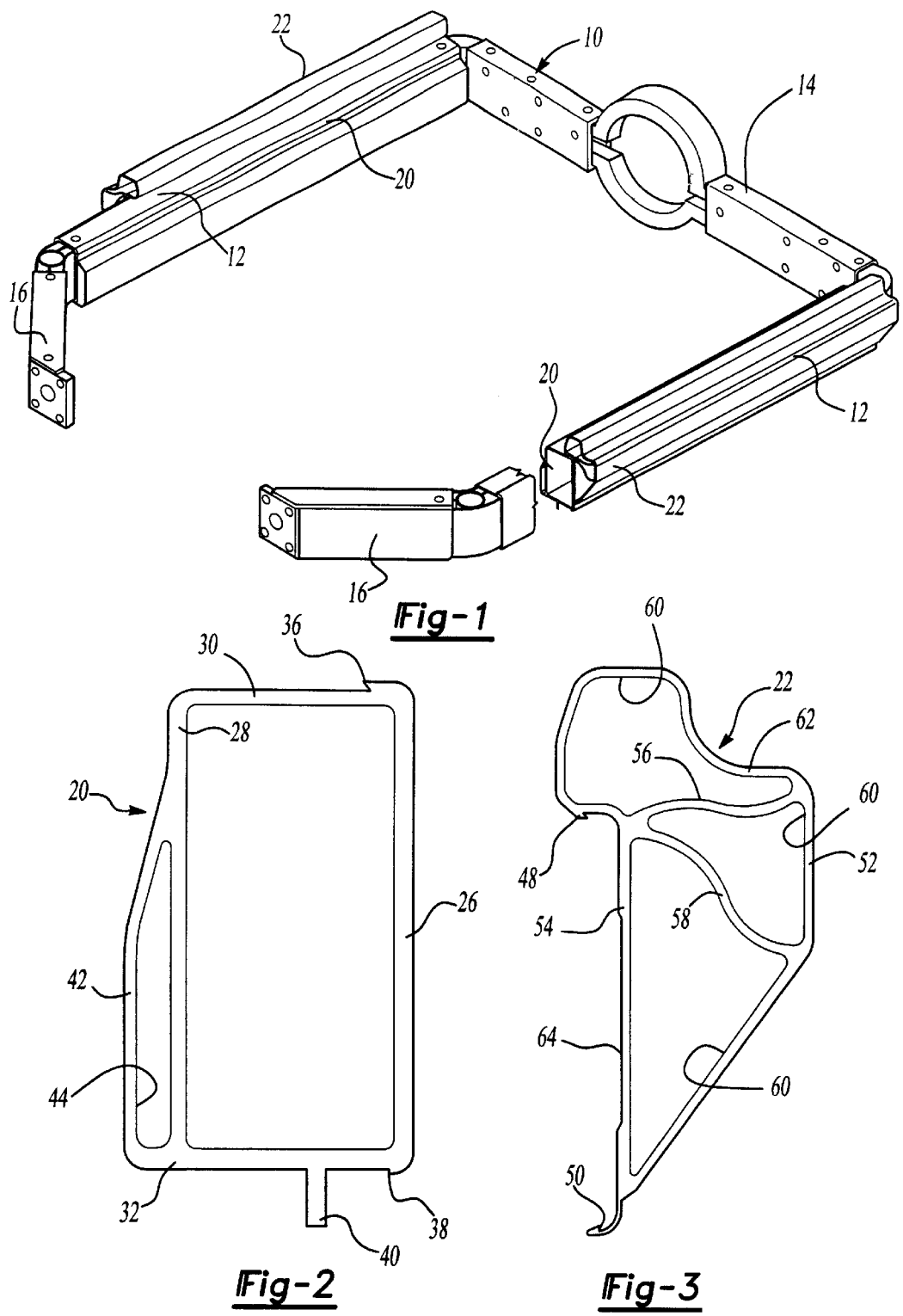

SIDE IMPACT BEAM ASSEMBLY

TECHNICAL FIELD

The present invention relates to a rocker panel side impact beam for a vehicle.

BACKGROUND ART

Vehicle frames normally include side rails in the vicinity of the vehicle rocker panel. The side rails of the vehicle are generally covered by body panels and trim. In the event of an impact to the side of a vehicle passenger compartment, forces are generally absorbed by body panels, such as the door or rocker panel. To repair a vehicle after a side collision, it may be necessary to repair or replace a substantial number of body panels and straighten the vehicle frame. The prior art has largely ignored the issue of limiting damage to a vehicle in the event of a side impact.

Conventional vehicle frames include steel frame rails, uni-body construction or, more recently, aluminum space frames. Generally, these types of structures have uniform strength and deformation properties and do not include specially designed impact absorption mechanisms. They also do not include structure defining crush zones that may be easily replaced while minimizing transmission of impact forces to the vehicle frame.

Beams have been developed that are incorporated in the doors of vehicles for improved side impact protection, for example, U.S. Pat. No. 5,573,297 discloses a side impact beam that is contained between the inner and outer door panels and is a relatively complex product that does not protect the vehicle frame. This patent also fails to disclose structure that limits damage by the use of impact absorbing crush zones.

In U.S. Pat. No. 5,954,390, a side impact system is disclosed wherein a cross-car beam extends laterally between the B-pillars of a vehicle and is also used to provide support for front seat assemblies. This patent also fails to disclose the use of impact absorbing crush zones.

These and other problems and disadvantages associated with prior art side impact beams and side impact systems are addressed by Applicant's invention as described below.

DISCLOSURE OF INVENTION

According to the present invention, a side impact beam assembly is provided for a vehicle. The side impact beam assembly includes a first beam of a chassis of the vehicle that is formed of a first material and extends along the side of the vehicle. A second beam is attached to the first beam and is formed of a second material that may be less rigid than the first material. The second beam has an outer portion that is spaced from the first beam and intermediate structure that is deformable with the outer portion toward the first beam upon impact.

The invention may also be characterized as an impact-absorbing beam assembly for a vehicle that comprises a chassis beam formed of an extruded metal having a predetermined degree of crushed strength. The assembly also includes a protective beam formed of an extruded metal having a predetermined degree of crush strength that is less than the crush strength of the chassis beam to which the protective beam is secured.

The present invention may also be characterized as a side impact beam assembly for a vehicle comprising a rocker beam having an exterior wall and an interior wall that are connected on their upper ends by a top wall and on their lower ends by a bottom wall. A side impact beam is secured to the rocker beam and has an outboard wall spaced from the exterior wall of the rocker beam and an inboard wall that is connected to the exterior wall of the rocker beam. At least one cell wall interconnects the outboard wall and the inboard wall forming closed cells between the inboard and outboard walls of the side impact beam.

The side impact beam assembly may also include a cell wall that is curved to provide limited reinforcement of the outboard wall against compression toward the inboard wall upon impact. The side impact beam assembly may include one cell wall or two or more cell walls, if desired.

The upper portion of the side impact beam may include a concave curved portion and two S-curved cell walls that facilitate compression of the cells as the outboard wall is impacted. The curved portion of the upper portion of the side impact beam and the S-curved cell walls may be bent to an increased extent of curvature instead of being compressed, thereby providing limited crush resistance.

According to another aspect of the present invention, the side impact beam assembly may include a first set of interlocking elements that are provided on the rocker beam and a second set of interlocking elements that are provided on the side impact beam. The interlocking elements on the side impact beam are adapted to engage the first set of interlocking elements on the rocker beam to secure the side impact beam to the rocker beam. The interlocking element provided on the rocker beam may include an upper rib formed on the top wall and a lower rib formed on the bottom wall of the rocker beam. First and second hook ribs may be formed on the upper end of the side impact beam and on the lower end of the side impact beam. The first and second hook ribs are adapted to engage the upper and lower ribs on the rocker beam to secure the side impact beam to the rocker beam.

Attachment of the side impact beam to the rocker beam may also be assured by providing a bonding agent in a recess formed between the two beams.

The rocker beam may include attachment flanges for securing the rocker panel to the compartment panel of the vehicle. The rocker beam may also include a double wall portion that defines a pocket extending lengthwise along the rocker beam. The pocket formed by the double wall of the rocker beam may be used as a conduit for wiring or tubing, if desired.

The rocker beam is preferably formed of a extruded aluminum and the side impact beam is preferably formed of a extruded aluminum compound that is less rigid than the extruded aluminum compound used to form the rocker beam. Alternatively, the side impact beam may be formed of an extruded polymeric material that would deform preferentially to the extruded aluminum used to form the rocker beam.

These and other advantages and objects of the present invention will be better understood upon review of the attached drawings in light of the following detailed description.

BRIEF DESCRIPTION OF DRAWINGS

FIG. 1 is a perspective view of a space frame chassis incorporating the side rail assemblies of the present invention.

FIG. 2 is a cross-sectional view of a chassis beam forming part of the side rail assembly.

FIG. 3 is a cross-sectional view of a protective beam forming part of the side rail assembly.

BEST MODE FOR CARRYING OUT THE INVENTION

Referring now to FIG. 1, a space frame chassis is generally indicated by reference numeral 10. Side rail assemblies 12 interconnect a rear rail 14 and front rail 16 that form part of the chassis 10. The side rail assemblies 12 include a chassis beam 20, or rocker beam, and a protective beam 22, or side impact beam.

Referring now to FIG. 2, the chassis beam 20 is shown to have an exterior wall 26 and an interior wall 28 that are interconnected by a top wall 30 and a bottom wall 32.

The chassis beam 20 and protective beam 22 are provided with interlocking elements that are used to connect the protective beam 22 to the chassis beam 20. The interlocking elements are formed in part by an upper rib 36 formed on the top wall 30 and a lower rib 38 formed on the bottom wall 32.

An attachment flange 40 is provided for attachment to the compartment pan (not shown) of a vehicle. Similar attachment flanges could be formed on other parts of the chassis beam 20 depending upon the design requirements for the vehicle. The chassis beam 20 also includes a double wall portion 42 that defines a pocket 44. The double wall portion 42 may be provided as a filler between the chassis beam 20 and the compartment pan and may provide an additional attachment surface. The pocket 44 may function as a conduit for wiring or tubing.

Referring now to FIG. 3, the protective beam 22 includes interlocking elements that cooperate with the interlocking elements on the chassis beam 20 whereby the protective beam 22 may be easily connected to the chassis beam 20. Upper hook rib 48 and lower hook rib 50 serve as another part of the interlocking elements on the protective beam. The protective beam 22 includes an outboard wall 52 that is spaced from inboard wall 54. Inboard wall 54 is secured to the exterior wall 26 of the chassis beam 20. The space between the outboard wall 52 and the inboard wall 54 is divided by an upper s-curved cell wall 56 and a lower s-curved cell wall 58. The upper and lower cell walls 56, 58 form closed cells 60 in conjunction with outboard wall 52 and inboard wall 54. An upper portion of the outboard wall 62 preferably has a complex curve wall section. The s-curved cell walls 56, 58 and complex curved outboard wall 62 provide limited crush resistance when an impact is imparted to the protective beam 22. Since the cell walls and outboard wall have curved sections, an impact to the protective beam 22 causes the cell walls and outboard wall to merely bend to a greater extent instead of being compressed lengthwise.

The inboard wall 54 preferably includes a glue recess 64 on the surface facing the exterior wall 26 of the chassis beam 20. Glue may be applied to or injected into the glue recess 64 to compliment the interlocking elements formed on the chassis beam 20 and protective beam 22.

The chassis beam 20 and protective beam 22 are preferably formed as aluminum extrusions. The protective beam 22 may be formed from a different alloy than the chassis beam 20 so that the protective beam 22 will bend preferentially to the chassis beam 20. The protective beam 22 could also be formed from thermoplastic or thermoset resin, if desired.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A side impact beam assembly for a vehicle comprising:
   a first beam of a chassis of the vehicle being formed of a first material and extending along the side of a vehicle; and
   a second beam attached to the first beam and being formed of a second material that is less rigid than the first material, the second beam having an outboard wall spaced from the exterior wall of the first beam, an inboard wall connected to the exterior wall of the first beam, and at least one cell wall interconnecting the outboard wall and the inboard wall and forming closed cells between the inboard and outboard walls with the cell wall being deformable with the outboard wall toward the first beam upon impact.

2. An impact absorbing beam assembly for a vehicle comprising:
   a chassis beam formed of an extruded metal having a predetermined degree of crush strength, the chassis beam having a plurality of walls defining a hollow space;
   a protective beam attached to the chassis beam that is formed of an extruded metal having a predetermined degree of crush strength that is less than the crush strength of the chassis beam, the protective beam having an outboard wall spaced from the chassis beam, an inboard wall connected to the chassis beam, and at least one cell wall interconnecting the outboard wall and the inboard wall and forming closed cells between the inboard and outboard walls.

3. A side impact beam assembly for a vehicle comprising:
   a rocker beam having an exterior wall and an interior wall connected on their upper ends by a top wall and on their lower ends by a bottom wall; and
   a side impact beam secured to the rocker beam and having an outboard wall spaced from the exterior wall of the rocker beam, an inboard wall connected to the exterior wall of the rocker beam, and at least one cell wall interconnecting the outboard wall and the inboard wall and forming closed cells between the inboard and outboard walls.

4. The side impact beam assembly of claim 3 wherein the cell wall of the side impact beam is curved to provide limited reinforcement of the outboard wall against compression toward the inboard wall upon impact.

5. The side impact beam assembly of claim 3 wherein the side impact beam has two cell walls.

6. The side impact beam assembly of claim 3 wherein the outboard wall of the side impact beam has an upper portion that has a concave curved portion and two S-curved cell walls that permit the cells to be compressed as the outboard wall is impacted wherein the curved portion of the upper portion of the side impact beam and the S-curved cell walls may be bent to an increased extent of curvature instead of being compressed thereby providing limited crush resistance.

7. The side impact beam assembly of claim 3 wherein a first set of interlocking elements are provided on the rocker beam and a second set of interlocking elements are provided on the side impact beam that engage the first set of interlocking elements to secure the side impact beam to the rocker beam.

8. The side impact beam assembly of claim 3 wherein an upper rib is formed on the top wall, a lower rib is formed on the bottom wall, a first hook rib is formed on the upper end of the side impact beam and a second hook rib is formed on the lower end of the side impact beam, wherein the upper rib and the lower rib are engaged by the first and second hook ribs, respectively, to secure the side impact beam to the rocker beam.

9. The side impact beam assembly of claim 3 wherein a recess is formed on a surface of the side impact beam that faces the rocker beam and a bonding agent is injected into the recess to secure the side impact beam to the rocker beam.

10. The side impact beam assembly of claim 3 wherein an attachment flange is provided on the rocker beam for securing a compartment panel of the vehicle to the rocker beam.

11. The side impact beam assembly of claim 3 wherein the interior wall of the rocker beam is formed by a double wall that defines a pocket extending lengthwise along the rocker beam.

12. The side impact beam assembly of claim 11 wherein the pocket formed by the double wall may be used as a conduit.

13. The side impact beam assembly of claim 3 wherein the rocker beam is formed of extruded aluminum and the side impact beam is formed of extruded aluminum.

14. The side impact beam assembly of claim 3 wherein the rocker beam is formed of extruded aluminum and the side impact beam is formed of extruded polymeric material.

* * * * *